United States Patent
Lucioni

(10) Patent No.: US 11,930,473 B2
(45) Date of Patent: Mar. 12, 2024

(54) METHOD AND CELLULAR CONNECTIVITY UNIT FOR PROVIDING MOBILE CONNECTIVITY IN A VEHICLE

(71) Applicant: VOLKSWAGEN AKTIENGESELLSCHAFT, Wolfsburg (DE)

(72) Inventor: Gonzalo Lucioni, Witten (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 196 days.

(21) Appl. No.: 17/529,366

(22) Filed: Nov. 18, 2021

(65) Prior Publication Data

US 2022/0174639 A1   Jun. 2, 2022

(30) Foreign Application Priority Data

Nov. 27, 2020   (EP) .................................... 20210263

(51) Int. Cl.
| | |
|---|---|
| *H04W 28/02* | (2009.01) |
| *H04L 12/851* | (2013.01) |
| *H04W 4/48* | (2018.01) |
| *H04W 8/18* | (2009.01) |
| *H04W 8/20* | (2009.01) |

(Continued)

(52) U.S. Cl.
CPC ........... *H04W 60/005* (2013.01); *H04W 4/48* (2018.02); *H04W 8/183* (2013.01); *H04W 8/20* (2013.01); *H04W 48/06* (2013.01)

(58) Field of Classification Search
None
See application file for complete search history.

(56) References Cited

U.S. PATENT DOCUMENTS

| | | | |
|---|---|---|---|
| 10,250,562 B1* | 4/2019 | Srinath | ............... H04L 63/0209 |
| 2014/0253374 A1* | 9/2014 | Tibout | .................... G01S 19/04 |
| | | | 342/357.42 |

(Continued)

FOREIGN PATENT DOCUMENTS

WO   2015177602 A1   11/2015

OTHER PUBLICATIONS

Office Action; Japanese Patent Application No. 2021-192232; dated Nov. 29, 2022.

(Continued)

*Primary Examiner* — Gary Lafontant
(74) *Attorney, Agent, or Firm* — Barnes & Thornburg LLP

(57) ABSTRACT

A method for providing mobile connectivity in a transportation vehicle with a cellular connectivity unit using a first subscriber identification module associated with a first subscription for a first Mobile Network Operator and at least a second subscriber identification module associated with a second subscription for a second Mobile Network Operator. A first Access Point Name interface and at least one further Access Point Name interface are configured, wherein both are related to the first subscriber identification module. The first Access Point Name interface is used for network registration and data transport of the cellular connectivity unit assigned to the first subscriber identification module. The at least one further Access Point Name interface is used for network registration and data transport of the cellular connectivity unit assigned to the second subscriber identification module.

15 Claims, 3 Drawing Sheets

(51) Int. Cl.
*H04W 48/06* (2009.01)
*H04W 60/00* (2009.01)

(56) References Cited

U.S. PATENT DOCUMENTS

| | | |
|---|---|---|
| 2016/0352918 A1 | 12/2016 | Plestid et al. |
| 2017/0332274 A1* | 11/2017 | Link, II ............... H04M 15/852 |
| 2019/0098487 A1 | 3/2019 | Boettger |
| 2020/0154305 A1 | 5/2020 | Link, II |
| 2020/0220983 A1 | 7/2020 | Hu et al. |
| 2020/0288352 A1 | 9/2020 | Hu et al. |
| 2021/0127236 A1* | 4/2021 | Mansour ............. H04W 64/003 |
| 2022/0353780 A1* | 11/2022 | Kodali .................. H04L 45/306 |

OTHER PUBLICATIONS

Search Report for European Patent Application No. 20210263.8; dated May 27, 2021.

* cited by examiner

US 11,930,473 B2

METHOD AND CELLULAR CONNECTIVITY UNIT FOR PROVIDING MOBILE CONNECTIVITY IN A VEHICLE

PRIORITY CLAIM

This patent application claims priority to European Patent Application No. 20210263.8, filed 27 Nov. 2020, the disclosure of which is incorporated herein by reference in its entirety.

SUMMARY

Illustrative embodiments relate to a method and an in-car cellular connectivity unit for providing mobile connectivity in a transportation vehicle, in particular, for providing a Multi-SIM Multi-Access (MSMA) solution for the automotive area. Illustrative embodiments further relate to a transportation vehicle, which makes use of such a method or apparatus.

BRIEF DESCRIPTION OF THE DRAWINGS

Disclosed embodiments will be explained in further detail below with reference to the drawings, in which.

DETAILED DESCRIPTION

Figure 1:
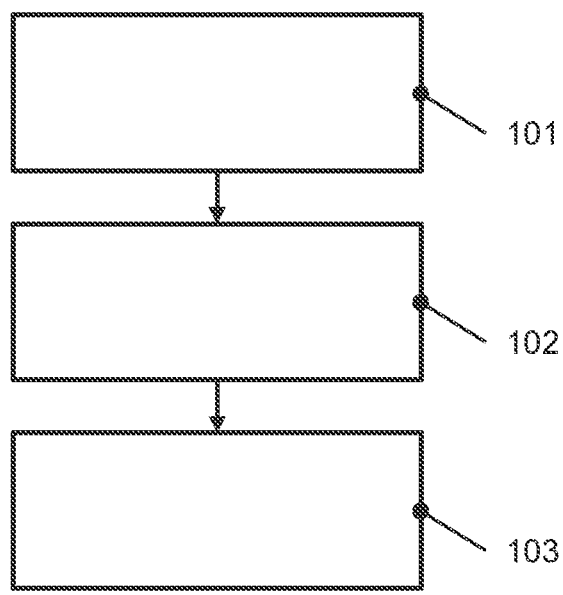
FIG. 1 schematically illustrates the basics operations of the disclosed method.

Wireless communication networks such as digital cellular networks are widespread today and are used not only in almost any mobile consumer device such as mobile phones but meanwhile also in many other devices and areas such as transportation vehicles. It is expected this will increase even more with the deployment of Fifth generation (5G) cellular wireless networks by network operators.

Accessing the digital cellular networks requires identifying and authenticating the subscribers, for which mainly an integrated circuit is used, commonly known as a SIM ("Subscriber Identity Module") card. The SIM is a detachable smart card, which may contain besides the user's subscription information also other data such as the subscriber's phone book. More recently, a so-called eSIM ("embedded-SIM") has been introduced which can be embedded directly into devices using wireless communication networks. An eSIM can be provisioned remotely by the provider, and users can add or remove a provider without the need to physically swap a SIM from the device.

Some wireless communication devices, in particular mobile phones, have a Dual-SIM or even Multi-SIM function. With a Dual-SIM function, two SIM cards or a conventional SIM card and an eSIM can be used in parallel in one device, thus providing users with access to a particular mobile network for each SIM card. I.e., the device can handle two different network subscriptions wherein each network subscription can be assigned to a different account or telephone number.

If a Dual-SIM device includes only a single cellular modem, only one of the two subscriptions may be transmitting or receiving radio frequency (RF) signals at a time. Such devices are referred to as Dual SIM Dual Standby (DSDS) devices, since while one subscription is actively transmitting or receiving signals the other subscription is put on standby. Contrary, at the same time transmitting or receiving signals for both subscriptions is possible with wireless devices including two cellular modems, referred to as Dual-SIM Dual-Active (DSDA) devices.

Besides the enablement of simultaneous communications, another benefit of the DSDA approach is that it easily allows splitting the billing for the two subscriptions. For such split billing there is an interest in various areas, more recently also for digital cellular networks in the automotive sector for transportation vehicles using two different connections for data services in parallel. In that case one connection is used for Business-to-Business (B2B) online services provided e.g., by the transportation vehicle manufacturer and another one for Business-to-Customer (B2C) online services used by the transportation vehicle user. A typical example for such online services used by the transportation vehicle user are infotainment services.

In this case, the DSDA approach allows to map the B2C data to the B2C SIM associated with a data plan paid by the transportation vehicle user, and the B2B data to the B2B SIM with a data plan paid by the transportation vehicle manufacturer, respectively. However, as mentioned above, the DSDA approach requires additional cellular connectivity hardware, for example, an additional set of RF antennas compared to single-SIM solutions. This leads to significant costs of respective automotive online connectivity solutions which is a clear drawback of this solution, especially since it is not known whether it will ever be used by a future transportation vehicle user of a particular transportation vehicle when manufacturing this transportation vehicle and installing the additional hardware.

Another solution uses split billing via a Multi-APN (Access Point Name) approach with a single SIM. In this case, online connectivity is performed via IP sessions, one to a B2C APN/Packet Data Network and another one to a B2B APN/Packet Data Network. Billing for the transportation vehicle user and the transportation vehicle manufacturer is done on an IP session base, respectively.

However, the Multi-APN approach limits connectivity to a single Mobile Network Operator (MNO) and requires both the transportation vehicle manufacturer and the transportation vehicle user to have a data plan contract with the MNO of choice. Currently, the MNO of choice in the EU is always the transportation vehicle manufacturer MNO, because the Multi-APN based split billing is not standard and it has to be implemented and validated for each contracted MNO. Experience shows that the transportation vehicle user acceptance for this approach is rather low. This is particularly true when the transportation vehicle manufacturer MNO is not the MNO with which the transportation vehicle user already has a SIM contract for his mobile phone.

An approach, which targets the transportation vehicle user acceptance problem of the current Multi-APN setup is known as "Carrier-of-Choice" (CoC). There, the Multi-APN setup is implemented with the MNO with which the transportation vehicle user already has a data plan. A re-use of the transportation vehicle user plan is possible which is known as "Pair-your-Plan" (PyP) or "Pair-the-Plan" (PtP). However, the CoC approach requires the transportation vehicle manufacturer to have Multi-APN based split-billing contracts with many MNOs and also to validate the Multi-APN based split-billing setup for each contracted MNO.

US 2019/0098487 A1 discloses a method to access services of multiple wireless networks by a wireless device, which attaches to a primary wireless network using a primary SIM or eSIM via a radio access network of the primary wireless network and establishes a context for IP network data connections using the primary SIM or eSIM. Furthermore, a packet data network connection is established via the radio access network of the primary wireless network to a gateway of a secondary wireless network using a secondary SIM or eSIM and the wireless device registers for access to services of the secondary wireless network with a server of the secondary wireless network using the secondary SIM or eSIM.

US 2016/352918 A1 discloses a method at a user equipment to verify enablement of data billing splitting. A credential is received at the user equipment, the credential including an international mobile subscriber identity from a physical universal integrated circuit card SIM application. The credential are stored on the user equipment. At a virtual subscriber identity module platform service module on the user equipment it is checked, whether the credential matches an international mobile subscriber identity of a universal integrated circuit card currently inserted into the user equipment. If the checking determines a match, the data billing splitting is enabled; and if the checking determines a mismatch, enablement of the data billing splitting is prevented.

US 2020/154305 A1 discloses a method and system for providing low bandwidth and high bandwidth communications services using different user equipment profiles. A user equipment device manages a first context traffic flow having a first class of service over a mobile network according to a first identity profile and a second context traffic flow having a second class of service over the mobile network according to a second identity profile. The user equipment device distributes portions of the second context traffic flow by directing a first portion of the second context traffic flow to a first subcarrier transmit circuit of the device and by directing at least a second portion of the second context traffic flow to a second subcarrier transmit circuit.

US 2020/220983 A1 discloses a method for connecting a device to subscriptions and cellular billing plans. The method includes enrolling a second device enabled for connectivity to cellular or other wireless service in a cellular subscription and associated billing plan associated with a first device. The enrollment includes providing an identifier for the second device to a cellular service provider associated with the first device by a second user, and allowing a second user to use capabilities of the second device as governed by the cellular subscription and an associated billing plan associated with the first device; while the second device is also configured to allow a first user to use capabilities of the second device as governed by the cellular subscription and an associated billing plan of the first user's choice.

Disclosed embodiments provide improved solutions for data services using Multi-SIM connectivity, particularly for use in the automotive area.

This is achieved by a method, an in-car cellular connectivity unit, and a transportation vehicle.

According to a first disclosed embodiment, a method for providing mobile connectivity in a transportation vehicle with a cellular connectivity unit using a first subscriber identification module associated with a first subscription for a first Mobile Network Operator and at least a second subscriber identification module associated with a second subscription for a second Mobile Network Operator, comprises the following actions performed by the cellular connectivity unit:

configuring in a cellular unit of the cellular connectivity unit a first Access Point Name interface and at least one further Access Point Name interface, wherein both the first Access Point Name interface and the at least one further Access Point Name interface are related to the first subscriber identification module;

using the first Access Point Name interface for network registration and data transport of the cellular connectivity unit assigned to the first subscriber identification module; and using the at least one further Access Point Name interface for network registration and data transport of the cellular connectivity unit assigned to the second subscriber identification module.

According to another disclosed embodiment, an in-car cellular connectivity unit for providing mobile connectivity in a transportation vehicle comprises:

a first subscriber identification module associated with a first subscription for a first Mobile Network Operator;

at least a second subscriber identification module associated with a second subscription for a second Mobile Network Operator;

a method or mechanism for configuring a first Access Point Name interface and at least one further Access Point Name interface, wherein both the first Access Point Name interface and the at least one further Access Point Name interface are related to the first subscriber identification module;

a method or mechanism for using the first Access Point Name interface for network registration and data transport of the cellular connectivity unit assigned to the first subscriber identification module; and a method or mechanism for using the at least one further Access Point Name interface for network registration and data transport of the cellular connectivity unit assigned to the second subscriber identification module.

The disclosed solution allows to reduce hardware costs and to scale Multi-SIM connectivity, for example, for B2B/B2C split billing, and is very flexible when compared with state-of-the-art solutions.

In an exemplary embodiment, the cellular connectivity unit uses a networking processor which interfaces to N subscriber identification modules and is able to build up to N network connections over IP sessions of related Access Point Name interfaces.

This makes it possible to relate several network connections to the first subscriber identification module and the first Mobile Network Operator.

In an exemplary embodiment, the first Mobile Network Operator provides an automotive network slice for providing untrusted non-3GPP access via a Packet Data Network for the transport of data assigned to the at least second subscriber identification module.

By using the automotive network slice the proper 5GC resource allocation required in the mobile network is met to ensure orchestration and performance requirements for providing untrusted non-3GPP access such as WLAN.

In an exemplary embodiment, the access over the at least one further Access Point Name interface is restricted to a Non-3GPP Inter-Working Function of the automotive network slice of the first Mobile Network Operator.

This allows the establishment of a specific tunnel between the cellular connectivity unit and a Non-3GPP Inter-Working Function required for the access.

In an exemplary embodiment, the restriction is accomplished by proper firewall settings in the cellular connectivity unit.

Defining proper firewall settings in the cellular connectivity unit has the benefit that data billing is protected from in-vehicle attacks.

In an exemplary embodiment, the restriction is accomplished by Deep Packet Inspection service filtering at the first Mobile Network Operator network side.

According to cellular networks such as 5G, tunneled access must be IPSec protected to provide secure communication over an Internet Protocol network. The DPI service used for that purpose can also be used for restricting the Access Point Name interface, in this way avoiding the need for additional measures.

In an exemplary embodiment, the at least second subscriber identification module is associated with the subscription of the transportation vehicle user's preferred Mobile Network Operator.

In this way, an associated tunneled network connection between the cellular connectivity unit and the Non-3GPP Inter-Working Function can be related to the second subscriber identification module and the second Mobile Network Operator. Similarly, further tunneled network connections may relate to further subscriber identification modules and Mobile Network Operators.

A transportation vehicle may be configured to perform a disclosed method or may comprise a disclosed in-car cellular connectivity unit. The transportation vehicle may be any type of vehicle, e.g., a car, a bus, a motorcycle, a commercial vehicle, in particular, a truck, an agricultural machinery, a construction machinery, a rail vehicle, etc. More generally, the disclosed embodiments can be used in any kind of connected vehicle and Internet of things (IoT) device or business with split-billing requirements, or, with active mobile multi-identity requirements. Further, the disclosed embodiments can be used in combination with the emerging GSMA's Automotive iDentity (AiD) Service which, e.g., enables the user to bring their AiD service with them as they move between different cars.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed to furthering the art, and are to be construed as being without limitation to such specifically recited examples and conditions.

Moreover, all statements herein reciting principles and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided by dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a method or mechanism for performing a specified function is intended to encompass any way of performing that function including, for example, a combination of circuit elements that performs that function or software in any form, including, therefore, firmware, microcode or the like, combined with appropriate circuitry for executing that software to perform the function. The disclosure as defined by such claims resides in the fact that the functionalities provided by the various recited methods or mechanisms are combined and brought together in the way which the claims call for. It is thus regarded that any method or mechanism that can provide those functionalities are equivalent to those shown herein.

FIG. 1 schematically illustrates an exemplary method for providing mobile connectivity in a transportation vehicle with a cellular connectivity unit using a first subscriber identification module associated with a first subscription for a first Mobile Network Operator and at least a second subscriber identification module associated with a second subscription for a second Mobile Network Operator.

Initially, a first Access Point Name interface and at least one further Access Point Name interface are configured in a first operation at 101. Both the first Access Point Name interface and the at least one further Access Point Name interface are related to the first subscriber identification module.

In operation at 102, the first Access Point Name interface is used for network registration and data transport of the cellular connectivity unit assigned to the first subscriber identification module.

In operation at 103, the at least one further Access Point Name interface is used for network registration and data transport of the cellular connectivity unit assigned to the second subscriber identification module.

In more detail, the disclosed embodiment makes uses of new 5G capabilities for the untrusted non-3GPP network access standardized recently. As specified in 3GPP TS 24.501 the network registration of User Equipment (UE) for untrusted non-3GPP access is performed independently from the 3GPP access. In addition, the scenario that the non-3GPP access and the 3GPP access belong to different MNOs is explicitly supported.

While the 3GPP access uses a radio access network (RAN) being part of a mobile telecommunication system, the non-3GPP access may use a wireless local area network such as WLAN to connect to the 3GPP core network. There are two basic principles for the Non-3GPP Access to the 3GPP core network, untrusted and trusted Access. For untrusted access, the mobile operator does not trust the access point the User Equipment (UE) is connected to and the encryption on the radio link is out of the scope of the mobile operator. Therefore, the UE tunnels the traffic to a gateway in the network, which is trusted by the mobile operator. In the case of trusted access the mobile operator trusts and operates the access points, i.e., the encryption of the radio link is also controlled by the operator and the credentials are derived from the security context in the UE and the network.

As further specified in 3GPP TS 23.501, the untrusted non-3GPP access to a 5G Core (5GC) network is performed via a Non-3GPP Inter-Working Function (N3IWF). The N3IWF encapsulates the access and presents the functionality to the following core functions as if the connection would in fact be a 3GGP access, in this way fully interfacing to 5GC network control-plane and user-plane functions.

Figure 2:
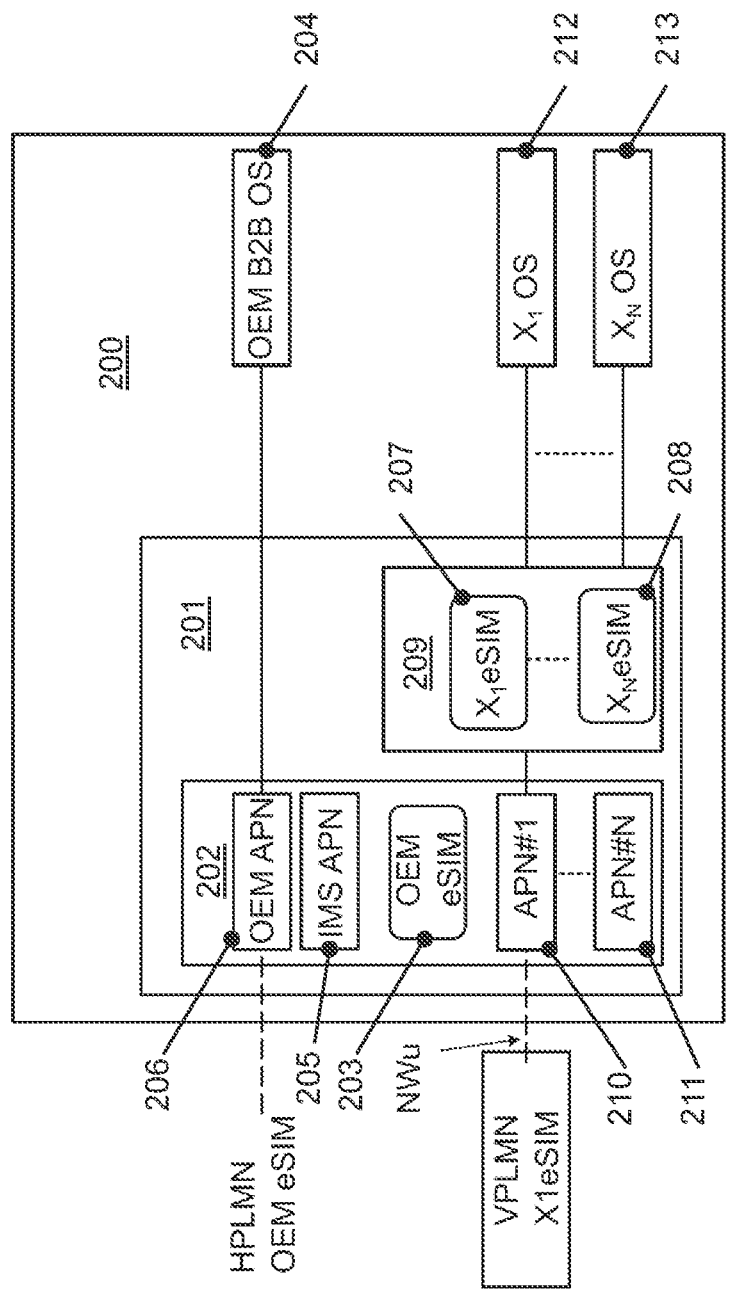
FIG. 2 schematically illustrates a block diagram of an exemplary embodiment with a transportation vehicle having a connectivity unit using the disclosed embodiments for B2B and B2C connectivity.

FIG. 2 schematically illustrates a block diagram of an exenokart embodiment with a transportation vehicle 200 having a cellular connectivity unit 201, in the following called Car UE, using the disclosed embodiment for B2B and B2C connectivity. Car UE 201 is communicatively coupled to IP online services through a cellular unit 202 using 3GPP cellular wireless circuitry and an OEM SIM or an OEM eSIM profile 203, respectively, for identification and authentication. For simplification, the use of a physical SIM or a profile inside of an eSIM is shorten as eSIM hereafter.

Voice and messaging services as well as OEM B2B online services 204 are provided via the Home Public Land Mobile Network (HPLMN) providing 3GPP access, in the following also briefly called home network.

For network registration and data transport of the cellular connectivity unit a first regular IMS Access Point Name (APN) interface 205 is provided, which is used for voice and messaging services via the IP Multimedia Subsystem (IMS) framework for delivering IP multimedia services as specified by 3GPP. However, this APN interface is not considered further here since the disclosure focusses on transmission of data for online services.

For online services the Car UE supports at least two further APN interfaces for data transport besides the IMS data APN interface 205, each one having an own IP session in-place.

First, for the Home Public Land Mobile Network (HPLMN) an OEM data Access Point Name (APN) interface 206 is provided, which is related to the OEM eSIM 203 and is used for the transport of OEM data, e.g., B2B service data of an OEM B2B online service. Furthermore, a secure and encrypted IPsec (Internet Protocol Security) tunnel, referred to as NWu, is established via a Non-3GPP Inter-Working Function (N3IWF) for the Visited Public Land Mobile Network (VPLMN), in the following also briefly called roaming network, of a specific eSIM 207, in the following called X1 eSIM. A further APN interface 210 is provided, which is also related to the OEM eSIM but is used for the transport of data assigned to X1 eSIM 207.

Depending on the application, also more than one further eSIM could be used, in general terms multiple eSIMs up to N eSIMs, in the following called X1 eSIM up to XN eSIM could be utilized. In that case, further APN interfaces, which are also related to the OEM eSIM, may be used for the transport of data assigned to these further eSIM, such as the additional APN interface 211 for XN eSIM 208 shown in the figure. However, these further eSIMs are optional.

The Car UE 201 is enhanced by a Networking Processor 209, which interfaces the up to N eSIMs. The Networking Processor 209 is able to build up to N 5G core network connections over IP sessions of related APN interfaces. Each connection is based on 5G untrusted non-3GPP network access and uses one of the interfaced eSIMs. The destination of each 5G untrusted non-3GPP access is always the N3IWF FQDN (Full Qualified Domain Name) of a specific slice of the OEM MNO network. The N3IWF FQDN may be either provisioned by the home operator of the interfaced eSIM or constructed by the Car UE. However, the Car UE will not use WLAN for the access as suggested in 3GPP TS 24.502 since the optimal access may be via cellular APN interfaces. Once an access is available, the Networking Processor routes the corresponding data traffic through, e.g., data from X1 Online Services 212 once X1 eSIM related online connectivity is available or optionally from further online services such as XN Online Services 213.

The access over the specific APN interfaces, such as APN #1 210 up to APN#N 211, is restricted to the N3IWF of an automotive network slice of the OEM MNO. This may be accomplished by proper firewall settings in the Car UE 201, or by Deep Packet Inspection (DPI) service filtering at the OEM MNO network side. The N3IWF itself may be accessible via a Packet Data Network which is related to the MSMA access as shown in the following.

Figure 3:
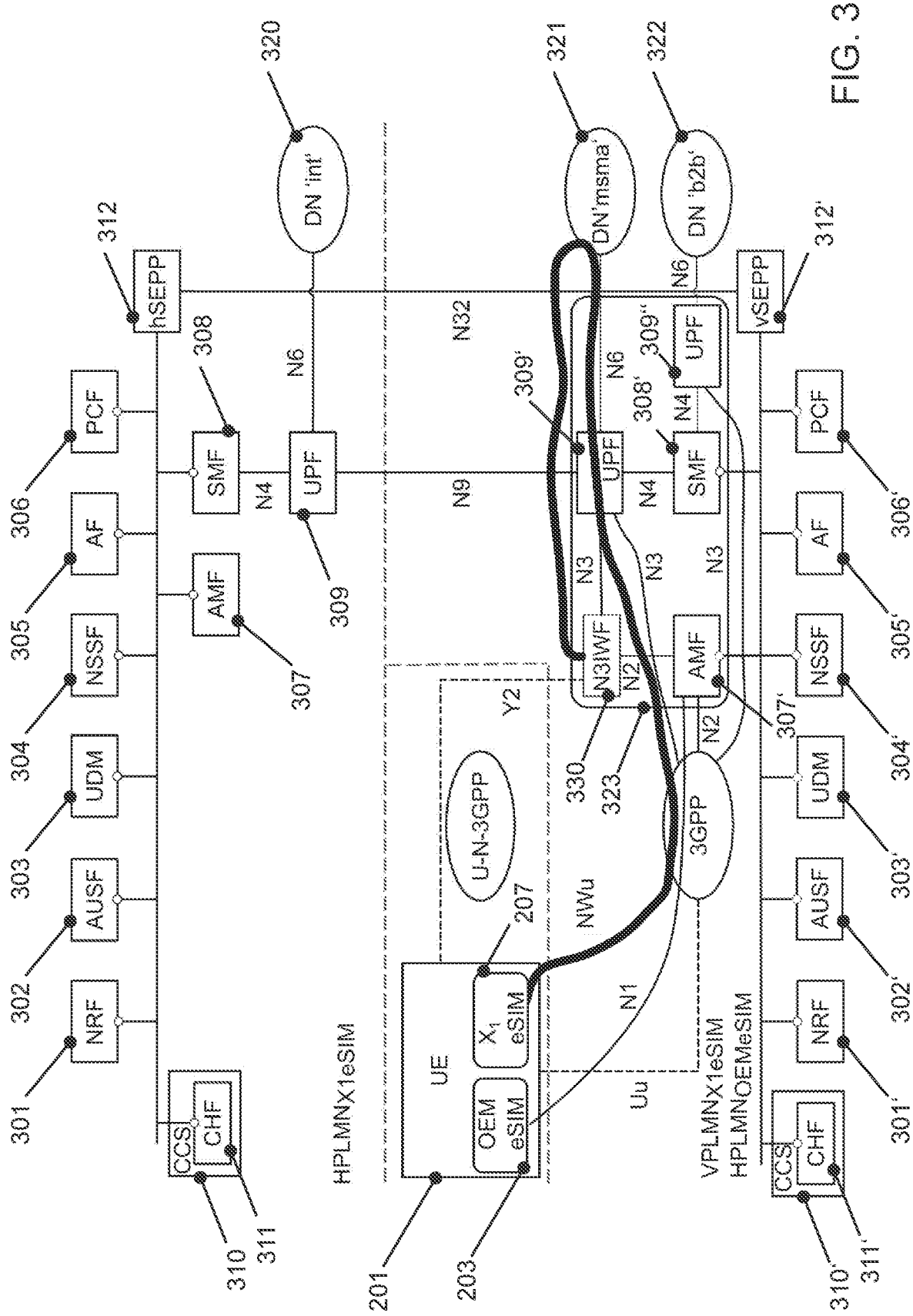
FIG. 3 schematically illustrates the embodiment of FIG. 2 from a 5G Core network perspective.

FIG. 3 schematically illustrates the embodiment of FIG. 2 from a 5GC perspective with the Car UE 201 comprising an OEM eSIM 203 as well as X1 eSIM 207 of the transportation vehicle user. The architecture is service-based wherein the core components, in 5G called network functions, are coupled via service interfaces wherein each component can communicate internally with each of the other components. Communication can also extend over networks via Security Edge Protection Proxy (SEPP) network entities protecting the connection between Service Consumers and Service Producers from a security perspective.

Which Network Functions are used depends on whether a local-break out (LBO) or home-routed (HR) architecture is used. In the shown embodiment a home-routed roaming setup for B2C is used, however, roaming may also be performed LBO based, alternatively. Furthermore, the 3GPP access may be performed over 3G or 4G, alternatively.

In the upper part of the figure core components of the cellular network HPLMN X1 eSIM are depicted which corresponds to the Home Public Land Mobile Network (HPLMN) of the X1 eSIM of the transportation vehicle user. HPLMN X1 eSIM comprises several network functions (NF), i.e., the

- Network Repository Function (NRF) 301, which keeps track of the services of the Network functions in the network;
- Authentication Server Function (AUSF) 302, which authenticates devices based on the authentication data generated by the UDM;
- Unified Data Management (UDM) 303, which generates authentication data used to authenticate devices and authorizes access for specific users based on subscription data;
- Network Slice Selection Function (NSSF) 304, which supports the selection of network slices requested by a device;
- Application Function (AF) 305, which acts a quality controller for applications and provides session related information to a policy charging and rules function element;
- Policy Control Function (PCF) 306, which provides policy rules to control plane function(s) to enforce them and gathers subscription information from the Unified Data Management function.

Access and Mobility Management Function (AMF) 307, which interacts with devices and the radio network through signaling over the N1 and N2 interfaces;

Session Management Function (SMF) 308, which manages the device sessions by establishing, modifying and releasing individual sessions and allocating IP addresses per session;

User Plane Function (UPF) 309, which mainly processes and forwards user data Charging Function (CHF) 311 being integrated in a Converged Charging System (CCS) 310, which covers the network's needs of charging and interaction with billing systems.

Furthermore, the architecture also comprises a Security Edge Protection Proxy (SEPP) network entity in the home network called hSEPP 312 to enable access of NF services through service based interfaces in network roaming scenarios. The User Plane Function (UPF) 309 serves as a gateway to a Packet Data Network "int" 320, corresponding to the transportation vehicle user's internet access for, e.g., infotainment purposes. Interaction between the NF services in the network functions are described by point-to-point reference points such as N4 between the network functions Session Management Function (SMF) 308 and the User Plane Function (UPF) 309. Note that only a roaming specific subset of the NF of the HPLMN X1 eSIM shown here is usually required on roaming scenarios.

In the lower part of the figure, core components are depicted which corresponds to the Home Public Land Mobile Network of a cellular network HPLMN OEM eSIM providing 3GPP access via the OEM eSIM 203 of the transportation vehicle manufacturer as well as the Visited Public Land Mobile Network VPLMN X1 eSIM providing untrusted Non-3GPP access via the X1 eSIM 207 of the transportation vehicle user, the latter mostly in a roaming scenario. 3GPP access of the car UE 201 to the Packet Data Network "b2b" 322 or Packet Data Network "msma" 321 takes place via N1, N2 and individual N3 interfaces, respectively.

In addition, untrusted Non-3GPP access of the car UE 201 to the N3IWF 330 takes place via the corresponding NWu tunnel.

The cellular network comprises network functions similar to those of HPLMN X1 eSIM, i.e., the Network Repository Function (NRF) 301', Authentication Server Function (AUSF) 302', Unified Data Management (UDM) 303', Network Slice Selection Function (NSSF) 304', Application Function (AF) 305', Policy Control Function (PCF) 306', and Charging Function (CHF) 311' being integrated in a Converged Charging System (CCS) 310'. Furthermore, the architecture also comprises a Security Edge Protection Proxy (SEPP) network entity in the visited network vSEPP 312' to enable access of NF services through service based interfaces in network roaming scenarios.

Further network functions are part of an automotive network slice 323 which is a logical 5GC network slice provided by the OEM MNO. In detail, the automotive network slice 323 comprises the following dedicated network functions:

Access and Mobility Management Function (AMF) 307',
Session Management Function (SMF) 308',
User Plane Functions (UPF) 309', 309", and
Non-3GPP Inter-Working Function (N3IWF) 330.

Same as the User Plane Function (UPF) 309" is serving as gateway to the Data Network "b2b" 322, the User Plane Function (UPF) 309' is serving as gateway to the Data Network "msma" 321, which is related to the MSMA access.

For the roaming of X1 eSIM tunnel NWu mentioned already above is established between X1 eSIM 207 and N31WF 330 via the Data Network "msma" 321. The N3IWF 330 interfaces to the 5GC network control-plane functions via N2 interface. An N3 interface between N31WF 330 and UPF 309' is established for data transmission, so that data can be carried over NWu between the car UE 201 and N31WF 330, and then across N3 between N31WF 330 and UPF 309'. Following that, an N9 interface between this UPF 309' and the UPF 309 of the HPLMN X1 eSIM is established and then using a N6 interface finally a communication path between this UPF 309 and data network "int" 320.

For charging purposes, a connection between hSEPP 312 in the home network HPLMN X1 eSIM and vSEPP 312' in the visited network VPLMN X1 eSIM, referred to as N32, is used for carrying billing information via proper service based interfaces. Charging follows committed rules and is compliant to 3GPP standard procedures for the roaming case. Note that other control plane NF will also use service based connectivity between the roaming network and the home network through SEPP proxying.

Since X1 eSIM is related to the customer's preferred MNO a DSDA equivalent split billing of B2B and B2C mobile online service data is possible this way. This not only covers split-billing for end-customers but also split-billing for scenarios in which backends from different businesses may require to get mobile network access via different eSIM and even different MNOs.

In the above example, the OEM MNO is the VPLMN (Visited Public Land Mobile Network) of a specific eSIM, i.e., X1 eSIM 207. However, if the OEM MNO is the HPLMN (Home PLMN) of a specific eSIM, say, e.g., X2 eSIM or B2B eSIM, charging is performed at the OEM MNO directly.

REFERENCE NUMERALS

101, 102, 103 Method operations
200 Transportation vehicle
201 OEM cellular connectivity unit
202 OEM cellular unit
203 OEM SIM/OEM eSIM profile
204 OEM B2B online services
205 IMS Access Point Name interface
206 OEM data Access Point Name interface
207, 208 eSIM
209 Networking Processor
210, 211 Access Point Name interface
212, 213 Online Services
301, 301' Network Repository Function
302, 302' Authentication Server Function
303, 303' Unified Data Management
304, 304' Network Slice Selection Function
305, 305' Application Function
306, 306' Policy Control Function
307, 307' Access and Mobility Management Function
308, 308' Session Management Function
309, 309', 309" User Plane Function
310, 310' Converged Charging System
311, 311' Charging Function
312, 312' Security Edge Protection Proxy
320, 321, 322 Packet Data Networks
323 Automotive network slice
330 Non-3GPP Inter-Working Function

The invention claimed is:

1. An in-car cellular connectivity unit for providing mobile connectivity in a transportation vehicle, the unit comprising:
   a first subscriber identification module associated with a first subscription for a first Mobile Network Operator;
   at least a second subscriber identification module associated with a second subscription for a second Mobile Network Operator;
   a configuration mechanism for configuring a first Access Point Name interface and for configuring at least one further Access Point Name interface, wherein both the first Access Point Name interface and the at least one further Access Point Name interface are related to the first subscriber identification module;
   a first network registration and transport mechanism that uses the first Access Point Name interface for cellular connectivity unit network registration and data transport assigned to the first subscriber identification module; and
   a second network registration and transport mechanism for using the at least one further Access Point Name interface for cellular connectivity unit network registration and data transport assigned to the second subscriber identification module,
   wherein simultaneous communication is provided for data transport assigned to the first subscriber identification module and the second subscriber identification module on a differentiated basis that provides both trusted and untrusted access,
   wherein the first Mobile Network Operator provides an automotive network slice for providing untrusted non 3GPP access via a dedicated Packet Data Network for the transport of data assigned to the at least second subscriber identification module, and
   wherein the access over the at least one further Access Point Name interface is restricted to a Non-3GPP Inter-Working Function of the automotive network slice of the first Mobile Network Operator, wherein a tunneled network connection is provided between the in-car cellular connectivity unit and the Non-3GPP Inter-Working Function for the second subscriber identification module and the second Mobile Network Operator for increased security of data transport there between,
   whereby the in-car cellular connectivity unit enables differentiated delivery of data transport and associated differentiated billing for such data transport.

2. A transportation vehicle comprising the in-car cellular connectivity unit of claim 1.

3. The unit of claim 1, wherein at least one of the first and the at least second subscriber identification modules is an embedded subscriber identification module.

4. The unit of claim 3, wherein the at least second subscriber identification module is associated with the subscription of the transportation vehicle user's preferred Mobile Network Operator.

5. The unit of claim 4, wherein the at least second subscriber identification module is associated with the subscription of the transportation vehicle user's preferred Mobile Network Operator for roaming.

6. The unit of claim 1, wherein the cellular connectivity unit uses a networking processor which interfaces to N subscriber identification modules and is able to build up to N network connections over IP sessions of related Access Point Name interfaces.

7. The unit of claim 1, wherein the restriction is accomplished by firewall settings in the cellular connectivity unit.

8. The unit of claim 1, wherein the restriction is accomplished by Deep Packet Inspection service filtering at the first Mobile Network Operator network side.

9. A method for providing mobile connectivity in a transportation vehicle with a cellular connectivity unit using a first subscriber identification module associated with a first subscription for a first Mobile Network Operator and at least a second subscriber identification module associated with a second subscription for a second Mobile Network Operator, the method comprising the following actions performed by the cellular connectivity unit:
   configuring in a cellular unit of the cellular connectivity unit a first Access Point Name interface and at least one further Access Point Name interface, wherein both the first Access Point Name interface and the at least one further Access Point Name interface are related to the first subscriber identification module;
   using the first Access Point Name interface for cellular connectivity unit network registration and data transport assigned to the first subscriber identification module; and
   using the at least one further Access Point Name interface for cellular connectivity unit network registration and data transport assigned to the second subscriber identification module,
   wherein simultaneous communication is provided for data transport assigned to the first subscriber identification module and the second subscriber identification module on a differentiated basis that provides both trusted and untrusted access,
   wherein the first Mobile Network Operator provides an automotive network slice for providing untrusted non-3GPP access via a dedicated Packet Data Network for the transport of data assigned to the at least second subscriber identification module, and
   wherein the access over the at least one further Access Point Name interface is restricted to a Non-3GPP Inter-Working Function of the automotive network slice of the first Mobile Network Operator, wherein a tunneled network connection is provided between the in-car cellular connectivity unit and the Non-3GPP Inter-Working Function for the second subscriber identification module and the second Mobile Network Operator for increased security of data transport there between,
   whereby the in-car cellular connectivity unit enables differentiated delivery of data transport and associated differentiated billing for such data transport.

10. The method of claim 9, wherein at least one of the first and the at least second subscriber identification modules is an embedded subscriber identification module.

11. The method of claim 10, wherein the at least second subscriber identification module is associated with the subscription of the transportation vehicle user's preferred Mobile Network Operator.

12. The method of claim 11, wherein the at least second subscriber identification module is associated with the subscription of the transportation vehicle user's preferred Mobile Network Operator for roaming.

13. The method of claim 9, wherein the cellular connectivity unit uses a networking processor which interfaces to N subscriber identification modules and is able to build up to N network connections over IP sessions of related Access Point Name interfaces.

14. The method of claim 11, wherein the restriction is accomplished by proper firewall settings in the cellular connectivity unit.

15. The method of claim 11, wherein the restriction is accomplished by Deep Packet Inspection service filtering at the first Mobile Network Operator network side.

\* \* \* \* \*